Jan. 7, 1930.                    W. CECIL                    1,742,635
                    GLASS HOLDER FOR SODA FOUNTAINS
                          Filed June 25, 1929
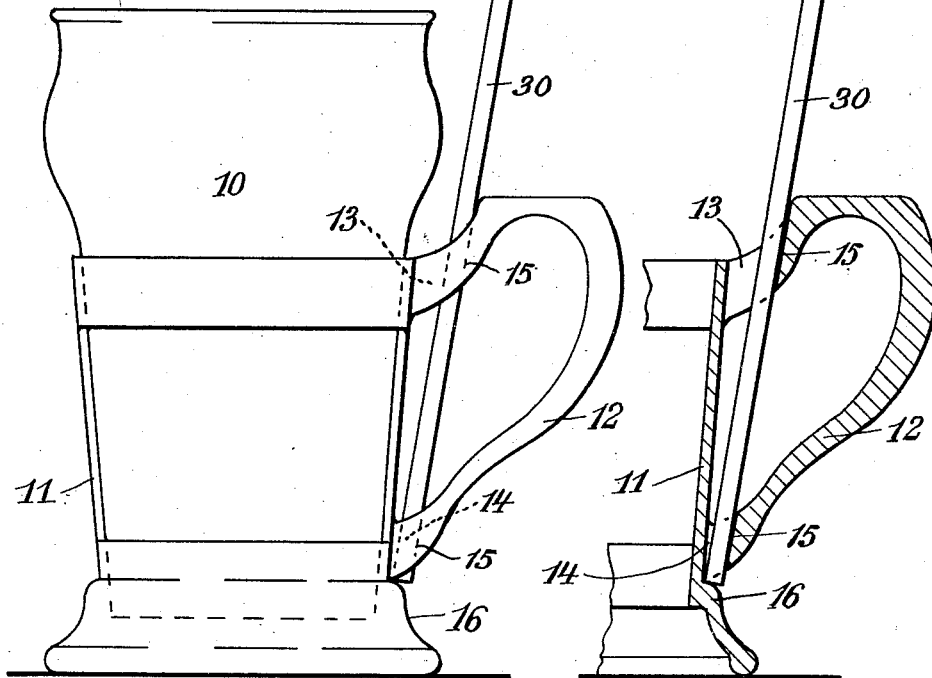
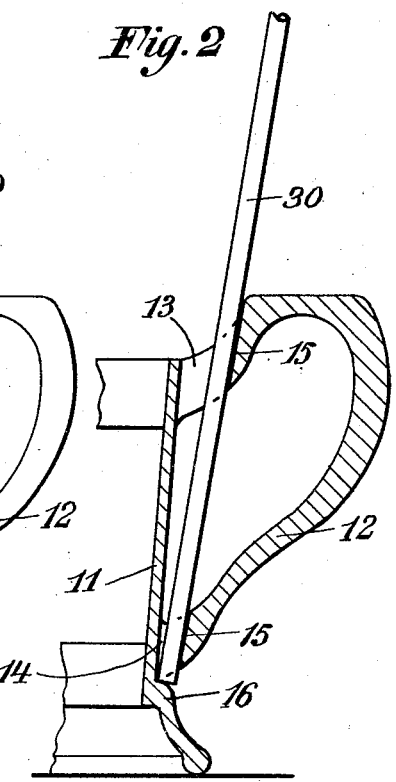
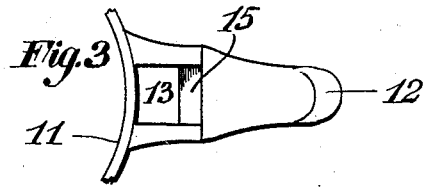
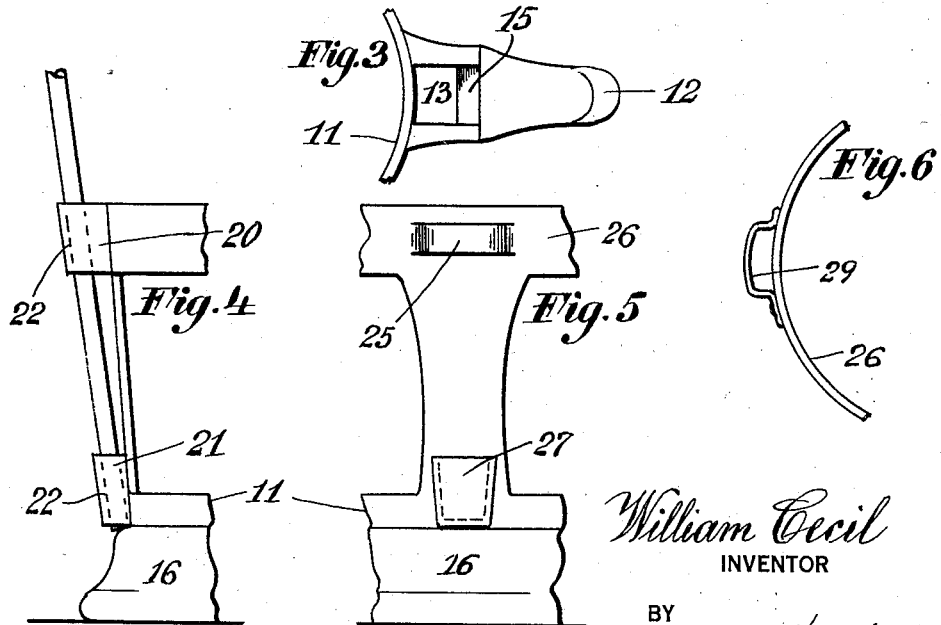
William Cecil
INVENTOR
BY
Ivan E. C. Konigsberg
ATTORNEY Patented Jan. 7, 1930

1,742,635

UNITED STATES PATENT OFFICE

WILLIAM CECIL, OF NEW YORK, N. Y.

GLASS HOLDER FOR SODA FOUNTAINS

Application filed June 25, 1929. Serial No. 373,637.

The object of my invention is to provide a novel, useful and improved glass holder for use at soda fountains and like places and embodying means for holding, containing and supporting drinking straws.

The advantages of my improved glass holder are that the straws may be conveniently served with the drink and do not become wet or broken, such as may be the case when they are merely laid on a tray. Again, it is more economical to serve one or two straws with each drink than to permit patrons to serve themselves from a large supply of straws.

My invention is embodied in a glass holder, which may be of any form, design or material adapted to hold a drinking glass and provided with suitable pockets, clips, openings or other means for holding the straws. In the accompanying drawing Fig. 1 is a side view of my improved glass holder showing the straws in position.

Fig. 2 is a partial sectional view thereof.

Fig. 3 is a partial plan view of the upper handle aperture.

Figs. 4, 5 and 6 illustrate modifications.

Referring to Figures 1 to 3, the reference numeral 10 denotes a drinking glass of the type used at soda fountains and which is supported in the usual manner in the holder 11 having a handle 12.

At some point or position on the holder there is provided means for supporting the drinking straws 30. One convenient embodiment is illustrated in Figures 1 to 3 in which the handle 12 is apertured at two places 13 and 14. The precise shape and size as well as the precise location of these apertures is a matter of design, convenience and depends also upon the style of the glass holder.

As shown in the drawing the straw containing apertures are located preferably in a position in which the straws may incline somewhat away from the glass, yet not interfere with the use of the handle or protrude unduly when serving the drink.

I have found it convenient to provide the apertures with inclined outer walls 15 so placed that the straw inclines towards the foot 16 of the holder and whereby the lower end of the straw finds a convenient support on the foot.

It will be seen that even though the holder is shaken in use, the straw cannot slip down through the openings and become lost. On the other hand, the upper opening 13 is so large that one or two straws may easily be slipped into it and naturally be guided into the lower opening as well.

The construction shown in Figure 1 is particularly convenient because many standard glass holders have handles of sufficient strength and size to permit the holes to be made without much trouble.

The holes may also be placed on the opposite side of the holder as in Figure 4 in which 20 and 21 designate upper and lower brackets suitably secured and having inclined walls 22 and adapted to contain the straws.

In Figure 5 the upper holding means 25 may be made by bending outwardly a part of the metal in the glass holder ring 26, while the lower holding means may be a socket 27 suitably secured near the foot of the holder. Again the upper holding means may be a mere clip 29 secured to the holder ring 26 at any point as shown in Figure 6 to co-operate with a lower holding means as shown in Figures 4 and 5, or a similar smaller clip may be provided near the foot of the glass holder.

I claim:

1. As a new article of manufacture a glass holder of the character described having upper and lower apertures in the handle thereof adapted to contain and hold in position one or more drinking straws in upright position on said holder.

2. As a new article of manufacture a glass holder of the character described comprising a glass holding body and a handle, the latter being provided with alined apertures having outwardly inclined walls for supporting drinking straws therein in a position inclined away from the body of the holder.

WILLIAM CECIL.